(No Model.) 8 Sheets—Sheet 1.

P. H. WATSON, Dec'd.
R. R. WATSON, Executrix.
MACHINE FOR MEASURING TEXTILE FABRICS, &c.

No. 359,583. Patented Mar. 15, 1887.

WITNESSES:
L. C. Hills
W. B. Masson

INVENTOR
Peter H. Watson
BY E. E. Masson
ATTORNEY (No Model.) 8 Sheets—Sheet 2.

P. H. WATSON, Dec'd.
R. R. WATSON, Executrix.
MACHINE FOR MEASURING TEXTILE FABRICS, &c.

No. 359,583. Patented Mar. 15, 1887.

WITNESSES:
S. C. Hills
W. B. Masson

INVENTOR
Peter H. Watson
BY E. E. Masson
ATTORNEY (No Model.) 8 Sheets—Sheet 3.
P. H. WATSON, Dec'd.
R. R. WATSON, Executrix.
MACHINE FOR MEASURING TEXTILE FABRICS, &c.

No. 359,583. Patented Mar. 15, 1887.

WITNESSES:
L. C. Hills
W. B. Masson

INVENTOR
Peter H. Watson,
BY E. E. Masson
ATTORNEY (No Model.) 8 Sheets—Sheet 4.
P. H. WATSON, Dec'd.
R. R. WATSON, Executrix.
MACHINE FOR MEASURING TEXTILE FABRICS, &c.
No. 359,583. Patented Mar. 15, 1887.
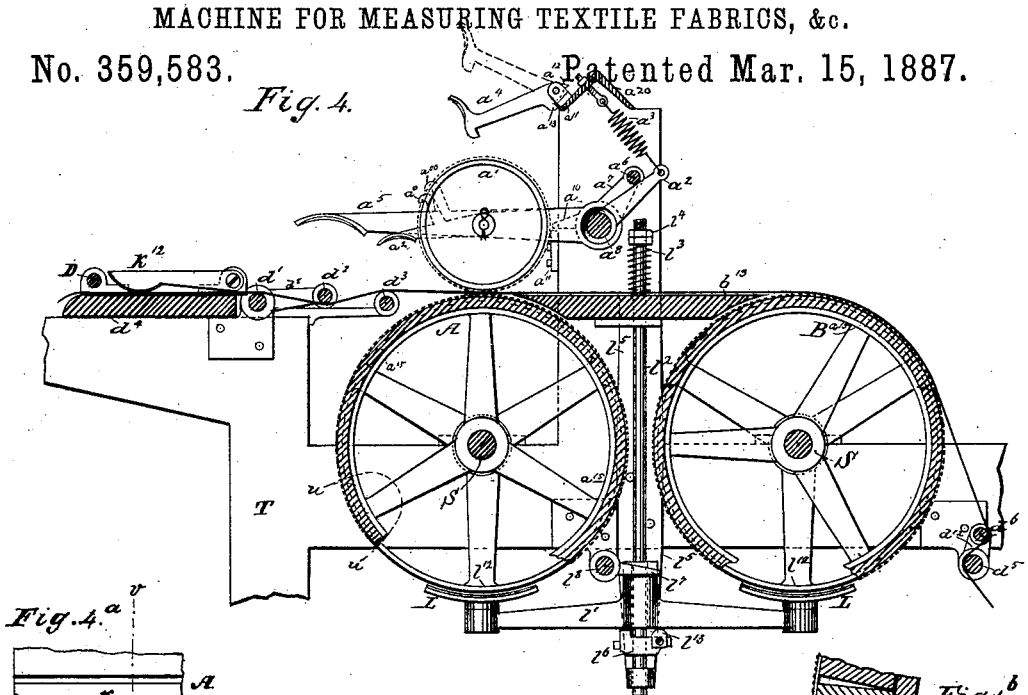
Fig. 4.
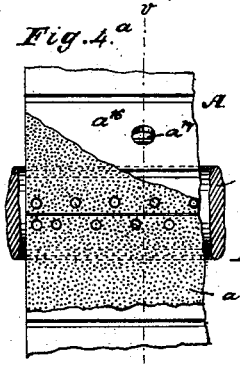
Fig. 4.$^a$
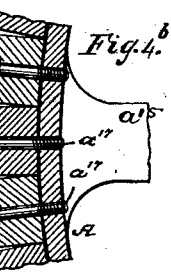
Fig. 4.$^b$
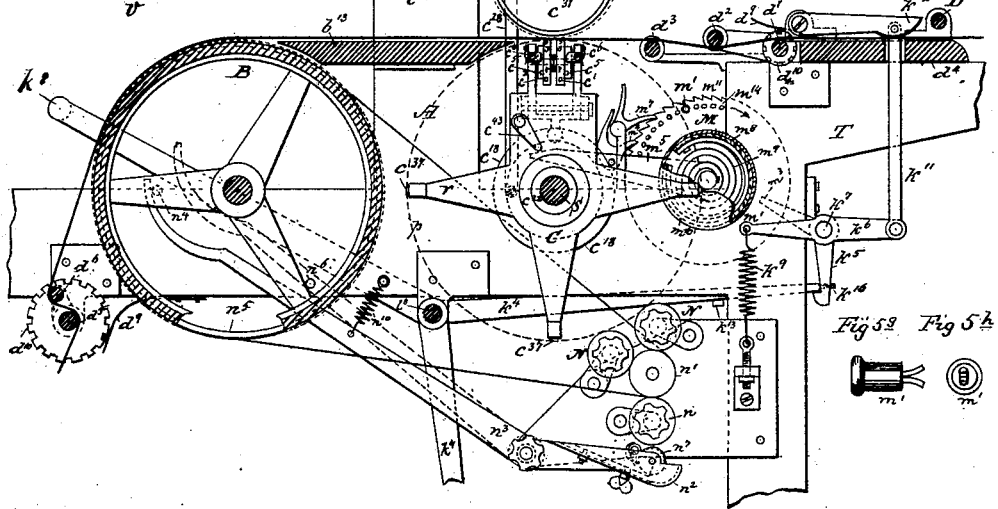
Fig. 5.
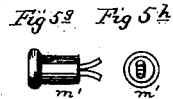
Fig. 5$^a$  Fig. 5$^b$
WITNESSES:
L. C. Hills
W. B. Masson
INVENTOR
Peter H. Watson
BY E. E. Masson
ATTORNEY (No Model.)  8 Sheets—Sheet 5.

P. H. WATSON, Dec'd.
R. R. WATSON, Executrix.
MACHINE FOR MEASURING TEXTILE FABRICS, &c.

No. 359,583. Patented Mar. 15, 1887.

WITNESSES:
L. C. Hills
W. B. Masson

INVENTOR
Peter H. Watson,
BY E. E. Masson
ATTORNEY (No Model.) 8 Sheets—Sheet 6.
P. H. WATSON, Dec'd.
R. R. WATSON, Executrix.
MACHINE FOR MEASURING TEXTILE FABRICS, &c.
No. 359,583. Patented Mar. 15, 1887.
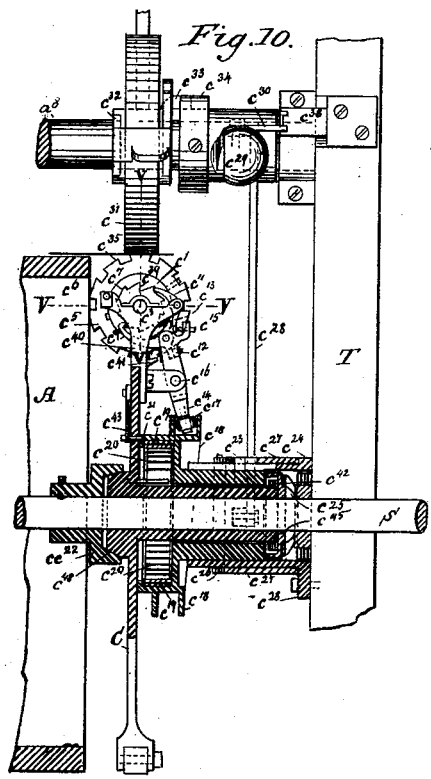
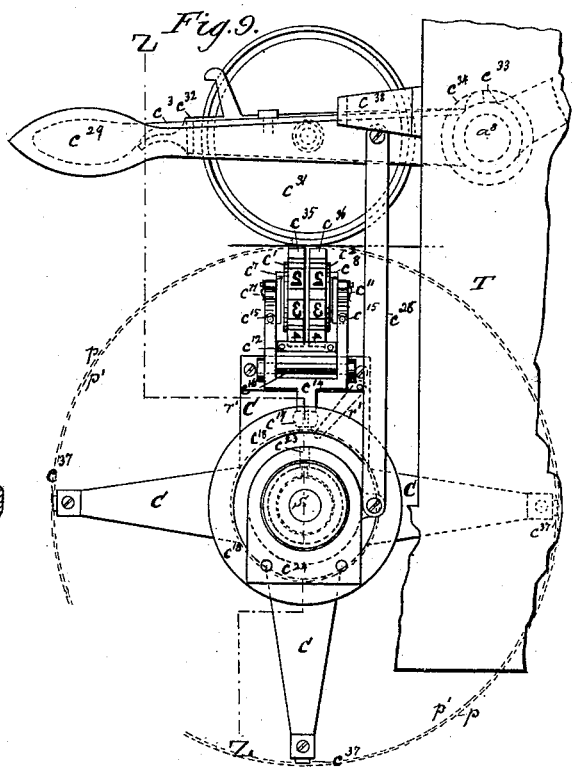
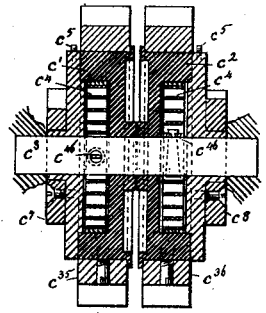
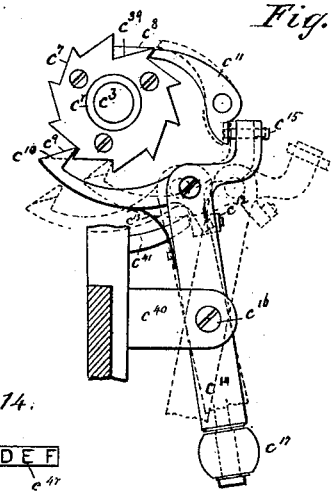
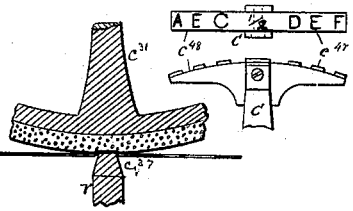
WITNESSES:
L. C. Hills
W. B. Masson
INVENTOR
Peter H. Watson
BY E. E. Masson
ATTORNEY

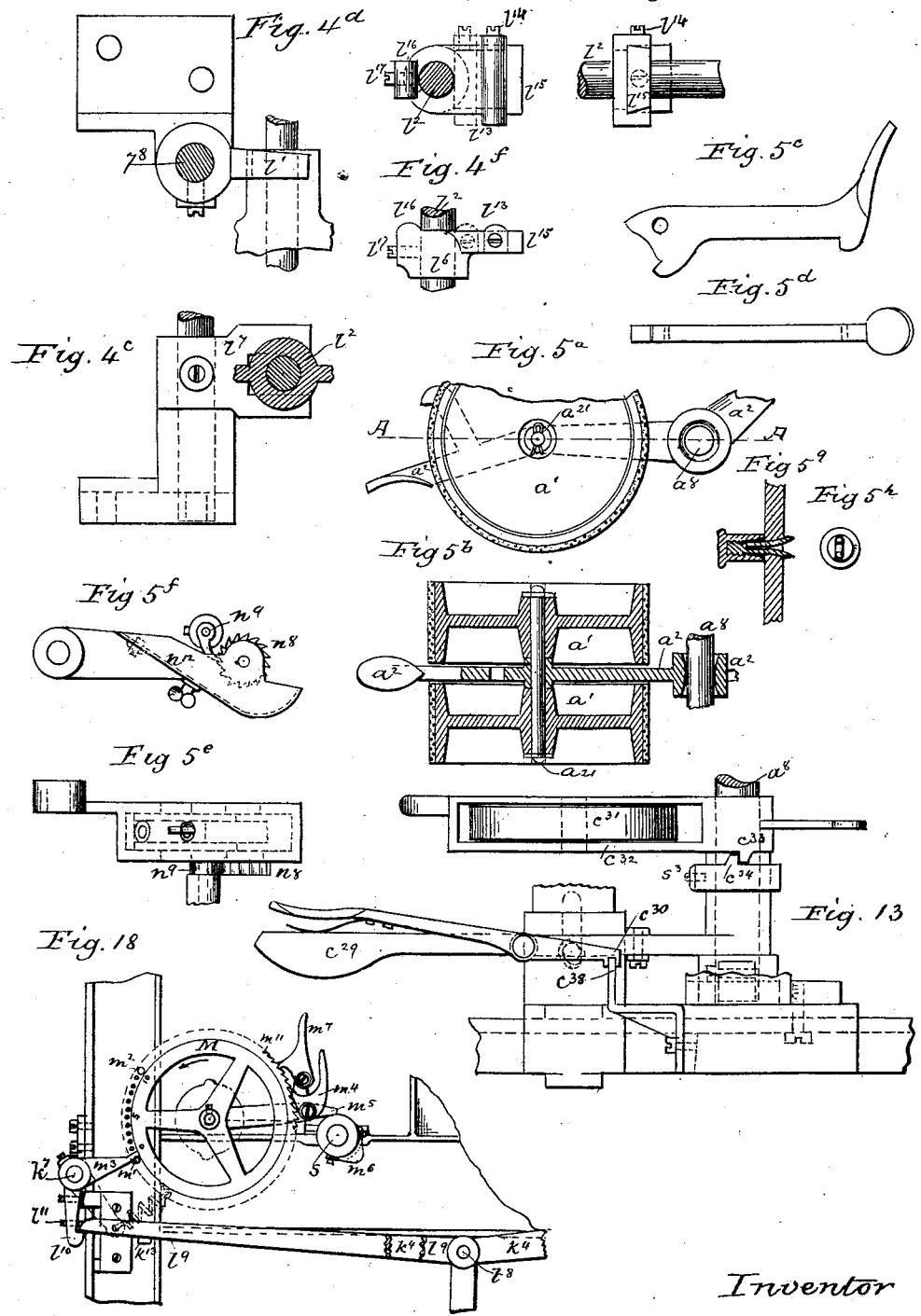

(No Model.) 8 Sheets—Sheet 8.
P. H. WATSON, Dec'd.
R. R. WATSON, Executrix.
MACHINE FOR MEASURING TEXTILE FABRICS, &c.
No. 359,583. Patented Mar. 15, 1887.
Fig. 15.
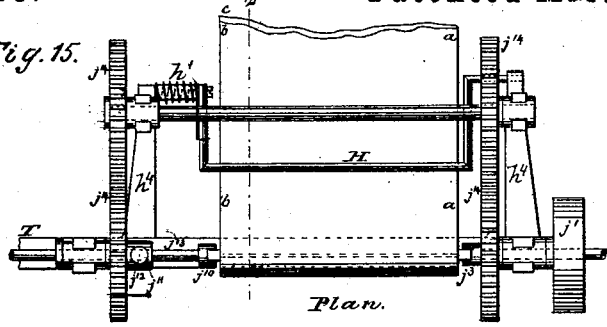
Plan.
Fig. 15.ª
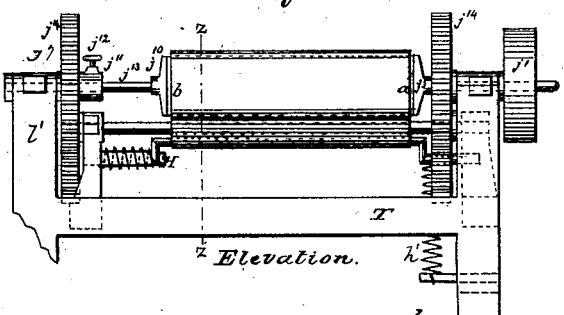
Elevation.
Fig. 15.ᵇ
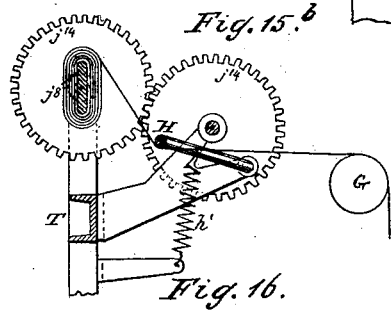
Fig. 16.
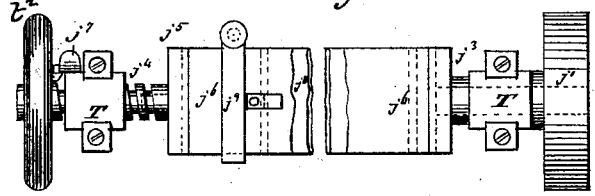
Fig. 17.
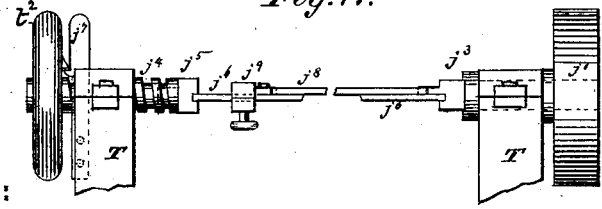
WITNESSES:
L. C. Hills
W. B. Masson
INVENTOR
Peter H. Watson
BY E. E. Masson
ATTORNEY

UNITED STATES PATENT OFFICE.

PETER H. WATSON, OF NEW YORK, N. Y.; ROSELLE REBECCA WATSON EXECUTRIX OF SAID PETER H. WATSON, DECEASED.

MACHINE FOR MEASURING TEXTILE FABRICS, &c.

SPECIFICATION forming part of Letters Patent No. 359,583, dated March 15, 1887.

Application filed July 30, 1883. Serial No. 102,332. (No model.)

*To all whom it may concern:*

Be it known that I, PETER H. WATSON, a citizen of the United States, residing at the city of New York, in the county of New York and State of New York, have invented certain new and useful improvements in machinery for measuring textile fabrics, registering the measure thereon, or indicating the measure without registering, plicating the fabric lengthwise, and making it up into packages, of which the following is a specification, the accompanying drawings making part thereof, the same letters of reference with their exponents (when they have any) referring to the same parts of the mechanism throughout the drawings.

Figure 1:
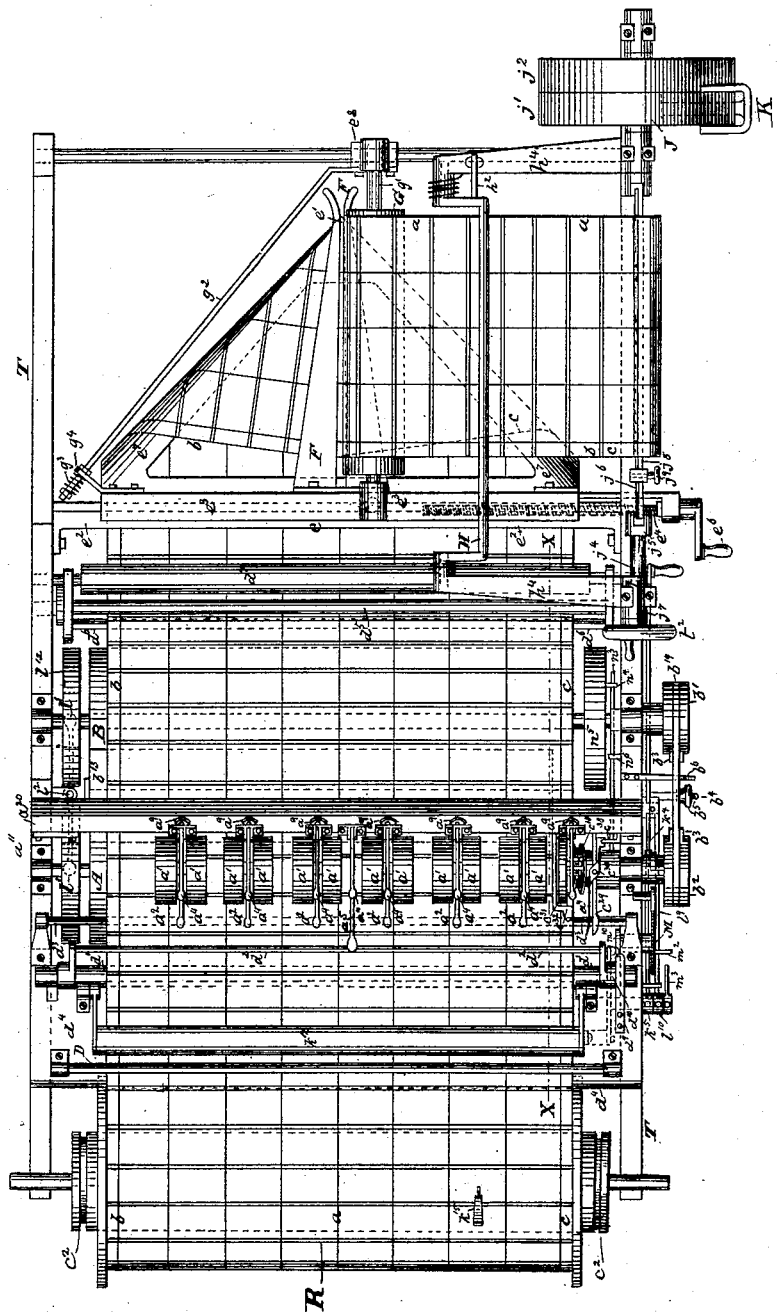
Figure 2:
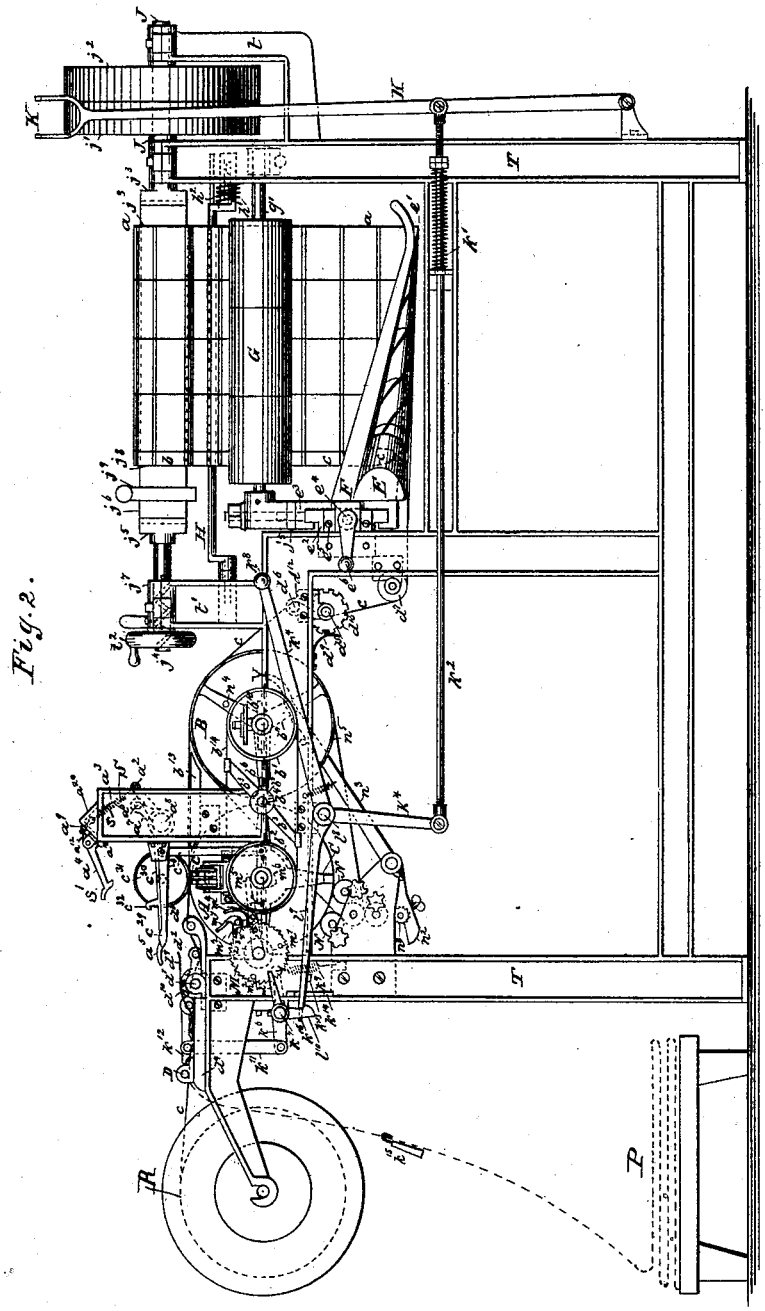
Figure 3:
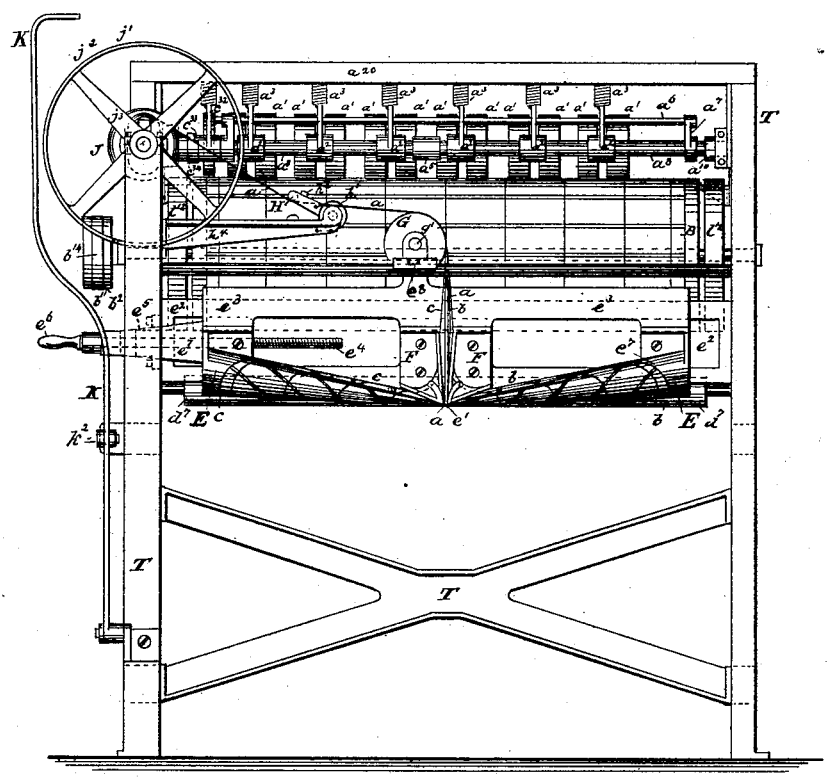
Figure 6:
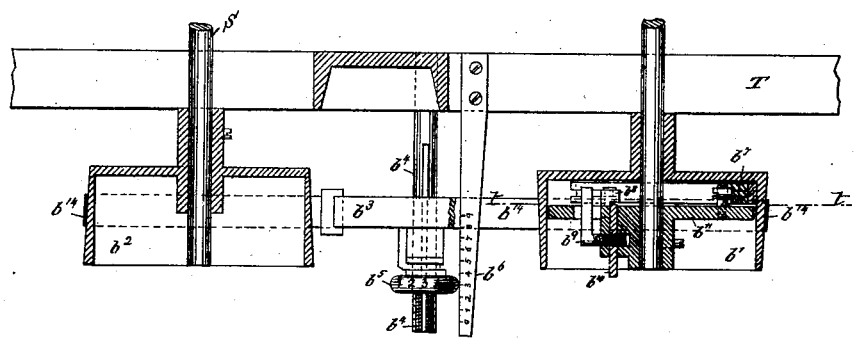
Figure 7:
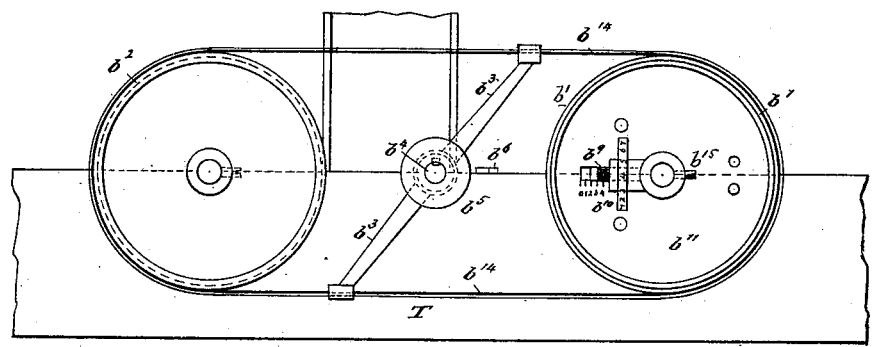
Figure 8:
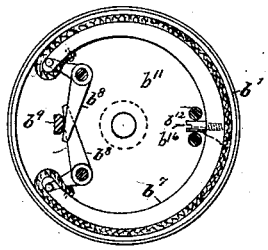

Figure 1 is a top view of the machine as seen in operation. Fig. 2 is an elevation of one side of the machine in operation, and showing how a web of cloth may be arranged to be fed into the machine from either a pile, P, or a roll, R. One of these alternative modes of presentation is most suitable for some kinds of goods and the other mode for other kinds. Fig. 3 is an elevation of another side of the machine as seen in operation. Fig. 4 is a vertical sectional view of a portion of the machine taken on one side of the line X X, Fig. 1, showing some details of the brake and of a part of the measuring mechanism. Fig. 4$^a$ represents a detached portion of one end of the measuring-cylinder cut through the line $u u$, Fig. 4. Fig. 4$^b$ represents a section at the line $v v$, Fig. 4$^a$. Fig. 4$^c$ is a detached view, seen from beneath, of the forked arm for taking off the pressure-brakes, with a section of the rock-shaft on which it is carried and the bracket by which the end of the shaft is supported. Fig. 4$^d$ is a view in elevation of the parts shown in Fig. 4$^c$. Fig. 4$^e$ is a top view of the collar for carrying a fixed fulcrum and an adjustable fulcrum (the latter shown in two positions, one of which is in dotted lines) for operating the brake-yoke. Fig. 4$^f$ is a side elevation of the parts shown in Fig. 4$^e$. Fig. 4$^g$ is an end elevation of the parts shown in the two preceding Figs. 4$^e$, 4$^f$, looking toward the outer end of the arm of the collar on which the adjustable fulcrum slides. Fig. 5 is a vertical sectional view of a portion of the machine, taken on the opposite side of the line X X, Fig. 1, to that represented by Fig. 4, showing, among other things, details of a portion of the register, of the dial, of the inking, and of the pressure-rolls mechanisms. Fig. 5$^a$ represents in elevation a fragment of one of the series of pressure-rolls and of its connections detached. Fig. 5$^b$ represents a section at line A A of Fig. 5$^a$, showing the manner in which the two halves of the roller are hung upon studs projecting from the opposite sides of a common rocking arm. Fig. 5$^c$ is a side elevation of the latch for holding up the pressure-rolls. Fig. 5$^d$ is a top view of the latch shown in Fig. 5$^a$. Fig. 5$^e$ is a bottom view of the ink-fountain, showing the wallower-roll in dotted lines and its ratchet, with the fixed pawl for turning the ratchet. Fig. 5$^f$ is a side elevation of the parts shown in Fig. 5$^e$. Fig. 5$^g$ is a sectional view detached of the movable trip-pin and of a part of the dial-plate of the indicator. Fig. 5$^h$ is an end view of the pin shown in Fig. 5$^g$. Fig. 6 is a horizontal sectional view taken upon the dotted line Y Y, Fig. 2, showing details of the regulator. Fig. 7 is a side elevation of the regulator. Fig. 8 is a vertical sectional view through the dotted line $t t$ of Fig. 6 to show the interior of the driving-pulley $b'$ of the regulator. Fig. 9 is a side elevation of a portion of the registering mechanism. Fig. 10 is a sectional view of the registering mechanism, taken upon the dotted line Z Z, Fig. 9, showing details. Fig. 11 is a sectional view of a part of the registering mechanism, taken upon line V V, Fig. 10. Fig. 12 is a diagram of a part of the register-ing mechanism to show the operation of the same. Fig. 13 is a view of a detail of the means for releasing the registering mechanism to allow it to return to zero. Fig. 14 is a view of another detail of the registering mechanism when a piece of cloth is passing between the impression-roll and a fraction-registering type, the type being indented into the cloth by the pressure of the elastic-faced roll. Fig. 15 is a top view of a part of the winding mechanism as driven at both ends of the roll by gearing. Fig. 15$^a$ is a side elevation of the parts shown in Fig. 15. Fig. 15$^b$ is a section on the line $w w$, Figs. 15 and 15$^a$. Fig. 16 is a top view of a part of the winding mechanism, with a winding-plate driven at one end of the roll by a belt-pulley. Fig. 17 is a side elevation of the parts shown in Fig. 16. Fig. 18 is a side elevation of the dial detached, with parts of its connections and of the frame of the machine.

My invention relates to the measuring of fabrics, registering thereon the measurement, and winding it into a compact package, and to improved mechanism for performing these operations, all of which are hereinafter fully described.

This machine is intended to measure cloth with accuracy, to register the measure upon it, or to indicate the measure without registry to the eye of the operator, to plicate or fold the cloth lengthwise of the web, and then to wind it into a smooth compact package, thus, by a series of combined automatic and co-operating movements, finishing the package complete at a single operation.

In this machine the fabric is not stretched before measurement and registry, but is simply straightened or flattened out, that it may lie smooth to measure correctly; but in the subsequent processes of plicating and winding the cloth may be subjected to any degree of stretching required for efficient plication and for making a smooth and compact package.

In this machine the cloth, after entering unstretched through the straightening-bars, hereinafter described, is drawn over a very light and easily-rotated cylinder of known circumference, which is revolved with a surface velocity equal to the velocity of the cloth. This cylinder carries upon its shaft the registering mechanism, to imprint upon the cloth while passing figures denoting linear measurements.

If the surface of a measuring-cylinder was just one yard in circumference, and it could be rotated by frictional contact with a piece of cloth passing it, so that the surface velocity of both at the successive points of contact would be the same, neither surface slipping, the conditions for accurate measurement of the cloth would be attained. It is because of the impracticability of rigidly carrying into effect these conditions that a regulating mechanism, herein described, has been devised. This in its action causes the two surfaces to deviate contrariwise from the equality of speed required for absolutely correct measure, so that the error of one will be promptly counteracted by an opposing error of the other, and thus a close approximation to correct measurement is indirectly reached, sufficiently near for all practical purposes in the fabric trade and manufacture.

In this machine two side frames, T, Figs. 1, 2, 3, are provided, which, being properly secured together by stays and bolts, carry the various mechanisms hereinafter described, including the measuring, registering, plicating, and packaging mechanisms, with their connections complete, and also the driving gear or pulleys $j^2$, Figs. 1, 2, 3, by which power is applied and the machine caused to operate.

The measuring-cylinder A, whose circumference is made equal to a given length, (generally one unit of the desired measure,) is made as light as is consistent with the requisite strength, rigidity, and durability. The surface is roughened sufficiently to prevent the cloth from slipping thereon, and the whole is made to turn as lightly as possible.

The cloth passes from the measuring-cylinder A to the actuating-cylinder B, and having been measured and printed before it left the measuring-cylinder A, it is apparent that whatever resistance the actuating-cylinder may offer to its forward movement will in no case affect such measurement. Therefore the cloth is drawn upon the actuating-cylinder with sufficient stress to turn it with its load.

The measuring and the actuating cylinders I have constructed of various materials and in different ways; but I prefer to make these cylinders by taking small round steel shafts S, Figs. 4, $4^a$, and mounting thereon a series of light narrow-rimmed cast-iron wheels, $a^{15}$, and securing to the rims of these wheels a series of narrow parallel wooden lags, $a^{16}$, arranged near together and in contact at their inner corners, but at some distance apart at their outer angles, the narrow line of contact at their inner corners affording mutual support, while the openings toward the outer surface of the lags will admit of the small amount of expansion and contraction to which each lag is subjected from atmospheric changes, and will also supply a series of recesses into which the enveloping covering of sand-paper may enter when it expands, to prevent blisters from being raised, such depression of the covering giving it a hold like a series of shallow tongues upon the cylinder and preventing it from being displaced by creeping. I have found these lags to work well when made of straight-grained pine about one-half inch square. They are attached to the wheels by screws $a^{17}$, forming a cylinder, which should be turned straight and to a uniform diameter of eleven inches and forty-six one-hundredths of an inch, including a covering of sand-paper, $a^{18}$, of the quality known in the trade as "No. 00." The sand-paper is cut in lengths of thirty-six inches and attached to the lag, on which its ends meet, by small nails $a^{19}$, and, if deemed necessary, owing to the want of strength in the paper, nails may be driven in several of the intermediate lags.

The end of the cloth being taken from a roll, R, Figs. 1, 2, or a pile, P, Fig. 2, is spread upon a feed-table, $d^4$, and passed forward under a stationary guide-rod, D, and trip-rail $k^{12}$, and through between a pair of straightening-rods consisting of a rock-shaft or bearing-rod, $d'$, an adjustable smoothing-rod, $d^2$, and over a fixed guide-bar, $d^3$, Figs. 2, 4, and 5, and the measuring-cylinder A. The bearing-rod $d'$ is supported at the ends in journals in the frame of the machine, so that it may be rocked therein, and is provided with a notched detent-wheel, $d^{10}$, and spring detent-pawl $d^9$, Fig. 5, projecting from the frame and engaging with the wheel to hold it and the shaft in any desired position. Near the ends of the bearing-rod $d'$ arms $d^8$ are firmly attached, which carry the smoothing-rod $d^2$, to bear against the cloth and by its position—determined by the set of the detent—deflect the cloth more or less from a direct line, to cause friction enough to produce a slight pull, just enough to smooth out wrinkles or slack places without stretching the body of the cloth, which then passes over the guide-bar $d^3$, to bring it again in line with the surface of the measuring and actuating cylinders. The cloth, being thus straightened, passes directly to the measuring-cylinner A, one end of which it overhangs sufficiently to give better access to the printing mechanism and to permit the elastic platen or impression-roll $c^{31}$ to bear the cloth within the path of the types, depressing it below the general surface of the cylinder, except when the types strike the cloth to indent it and deposit the ink which they carry.

To insure proper contact between the cloth and the measuring-cylinder A, a series of short independent pressure-rolls, $a'$, Figs. 1, 3, are provided. These pressure-rolls $a'$ run freely and loosely upon their bearings $a^{21}$, Figs. $5^a$, $5^b$, so that they may accommodate themselves more fully to inequalities or irregularities of the fabric. For the same reason they are made short and separated, so that each may revolve independently and with the actual surface velocity of the cloth at the point of contact, although, when the cloth varies in thickness or length in different parts, no two of the pressure-rolls may happen to have equal speed at the same instant; yet they will hold the cloth in contact with the measuring-cylinder A and leave it free to travel smoothly and without slip or inequality; but if, instead of these separate rolls, the pressure were given by one continuous roll extending the width of the cloth upon the measuring-cylinder A, or one roll controlled by any of the others, such inequalities of the cloth would then cause it to crowd forward or hang back, producing wrinkling and unequal running, that would disturb the accuracy of the measurement.

The pressure-rolls $a'$ are each shown in this instance made in two sections that run freely upon suitable studs or bearings, $a^{21}$, projecting from and carried by swinging levers $a^2$, which levers swing loosely on bell-mouthed boxes or hubs, as shown in Figs. $5^a$, $5^b$, upon a shaft, $a^8$, Fig. 4. The proper amount of pressure is given to the rolls $a'$ by means of springs $a^3$, regulated by adjusting-screws $a^9$ and supported on a bar, $a^{20}$, extending across the frame, Figs. 1, 2, 3, 4, 5. This bar also supports the spring $s$, Figs. 2, 5, 9, of the impression-roll $c^{31}$.

While inserting the first end of the cloth into the machine the pressure-rolls $a'$ may be severally hooked up out of the way by means of the swinging levers $a^2$, raised until their catches $a^0$, Fig. 4, engage with the latches $a^4$; or they may be held up collectively by means of the hand-lever $a^5$, Figs. 1, 4, shaft $a^8$, arms $a^7$, and the lifting-bar $a^6$, the hand-lever being raised until its catch $a^{00}$, Fig. 4, engages with its latch $a^4$. When the cloth is entered, the catches $a^0$ and $a^{00}$ are immediately tripped, to permit the rolls $a'$ to descend and bear upon the cloth.

The hinges of the latches $a^4$ are each fitted with a stop-lug, $a^{13}$, Figs. 4, 5, to meet the front edge of the foot of the bracket, in which the latch $a^4$ is pivoted, to arrest the descent of the latch after the rolls are detached, and hold it at the proper level to re-engage with the catches of the levers when the rolls are again raised. Another stop-lug, $a^{12}$, Figs. 4, 5, strikes against the opposite side of the bracket to prevent the latch $a^4$ from being thrown over too far when disengaged to drop, thus leaving the catch free to return by gravitation to the position for re-engaging with the catches when the rolls are again raised.

The surfaces of the pressure-rolls $a'$ are covered with felt, rubber, or other soft substance, to prevent them from bruising or otherwise injuring the surface of the cloth.

The shaft $a^8$ is provided with a stop-collar, $a^{10}$, which, by resting upon a lug, $a^{11}$, on the frame, prevents the shaft $a^8$ from rocking too far and letting the lever $a^5$ drop upon the cloth, Fig. 4.

From the measuring-cylinder A the cloth passes direct to the actuating-cylinder B. A stationary table or bench, $b^{13}$, Fig. 4, may be arranged just below the line of travel of the cloth, and securely supported by the frame of the machine. This table is only needed in the case of cloth of light and delicate or weak texture, to receive the end of the cloth when starting it through the machine and prevent it from sagging between the cylinders and from adhering to and being drawn and tangled around the measuring-cylinder. Machines for cloth of firm texture do not need such a table, and for them it may be omitted.

The mechanism for passing the cloth through the machine performs its duty without the aid of the registering or indicating mechanism, and leaves both free to be adjusted, started, stopped, or turned back at any point in the length of a piece of cloth, or when one section of a long piece of cloth has been measured and registered, and the register and indicator may be released, turned back to zero, and be started afresh to measure off and register another portion, and so divide the piece into two or more separately measured and registered parts.

The registering mechanism consists of a series of types bearing the desired numbers or marks and arranged at proper intervals upon the edge of a wheel or in the ends of the arms $r$ of a disk, C, Figs. 2, 5, 9, 10. The face of the types when in position for printing has the same radial dimensions as the measuring-cylinder A, and the types are carried in their revolution by the shaft thereof while the measuring is going on; but when a measurement is concluded the connection with the shaft of the measuring-cylinder is temporarily broken, and the disk C returns automatically to the initial or zero position.

The cipher-type, or the type for 1 2 3, or any other number in the units-wheel, may occupy the place for printing the first register of measurement instead of the zero-mark, leaving a blank length at the end of the cloth long enough for running through and connecting to the winder.

In general, the measurement being correct, its registry so near to the end of the goods is not important, and its omission will save much of the time and care required for drawing an end through by hand and registering the measure upon it without defacement by smearing with ink. It is only necessary to accomplish this purpose to place the stop for the zero-pawl in the same relative position to the digit-type selected that it would bear to the cipher-type if that were the first registered mark of measurement. The cipher-type in the tens-wheel must remain the zero. The termination of the blank end will be indicated by the dial, and will be the point to begin registering, after which the register and dial numbers will be in agreement if the registry was begun right. Such reciprocal and complemental action of the dial and the register lessen the labor and skill required for working the machine and the liability to undetected error from failure to begin the registry correctly.

One of the arms, $r'$, of the disk C carries a bracket, $c^{40}$, Figs. 9, 10, bearing the types representing the integers of measurement. The others arms, $r$, are provided with sockets, in which are secured the types $c^{37}$, showing the fractions, as one-half, one-fourth, three-fourths, or any especial private mark or imprint desired.

A hand-lever, $c^{29}$, Figs. 1, 5, 9, 10, is made to rock freely upon a shaft, $a^8$, of the machine, and is so connected to the registering mechanism by the rod $c^{28}$ that by a movement of the same the connection of the type-disk C with the shaft of the measuring-cylinder or contact of the clutch-surfaces $c^{22}$ $c^{18}$, secured thereon, can be broken and renewed at will. The action of the hand-lever is positive, and it is held, whether in or out of connection, by a latch, $c^{30}$, and keeper, $c^{38}$. A platen or impression roll, $c^{31}$, is provided to support the cloth against the type in passing. For thin cloth the platen is made with an elastic face. This roll is journaled in a rocking slotted lever, $c^{32}$, Figs. 5 and 13. This roll is pressed by a spring, $s$, adjusted by a set-screw, $a^9$, Figs. 2, 5, so as to bear it and the cloth within the sweep or path $p$, Figs. 5 and 9, of the registering-type carried by the disk C, the dotted line $p'$, Fig. 9, showing the depth of indentation under the adjustment of the stops $c^{33}$ and $c^{34}$, dotted in that figure, when working with an elastic-faced platen on thin cloth. The force by which the spring should bear the platen upon the cloth will vary from a few ounces for thin and delicate goods to two hundred pounds and upward for heavy carpeting, and the strength must be correspondingly varied by adjustment, or otherwise, to adapt it to the different grades of cloth. The distance of the intrusion of the cloth within the circular path of the type is regulated by an adjustable stop, $c^{34}$, on the hub of the lifting-line $c^{29}$, Figs. 9, 13, which meets a corresponding fixed stop, $c^{33}$, on the hinged arm or support $c^{32}$ for the platen, Figs. 5, 9, 13. These stops arrest the platen at the point where it will produce the depth of indentation and force of pressure of the types upon the cloth necessary to make a clear and distinct mark and to place the ink sufficiently below the general plane of the face of the cloth. The outer circle, $p$, Fig. 9, traces the path of the face of the types. The inner or dotted circle, $p'$, indicates a depth to which the cloth may, by an adjustment of the stop $c^{34}$, be intruded within the path of the types or pressed over them. The indentation of the cloth is more fully shown by the fragmentary sketch, Fig. 14.

The slotted lever $c^{32}$, carrying the platen, is made to swing upon the same center line as the hand-lever $c^{29}$, and has an adjustable pressure-spring, $s$, and latch $s'$, Figs. 2, 5, similar to those of the pressure-rolls $a'$, but stronger. It may be tripped with a swing-arm, $a^2$, by the lifting-bar $a^6$, as described. Upon the hub of the slotted lever $c^{32}$ is a stop, $c^{33}$, which engages with an opposing stop, $c^{34}$, or an equivalent notch, of an adjustable collar, which is seated upon and concentric with the hub of the hand-lever $c^{29}$. The collar is secured upon its seat to hold the stop $c^{34}$ in any required position by a set-screw, $s^3$. The operation of these stops is such that when the hand-lever $c^{29}$ is lifted, in the operation of disengaging the clutch $c^{22}$, the slotted lever $c^{32}$ is also lifted, raising the impression-roll clear of the cloth, so that it may not cause any irregular action thereupon by the type in returning to zero. In this position the lever $c^{29}$ is retained by the latch $c^{30}$ engaging with the keeper $c^{38}$, Figs. 5, 10, 13, while adjusting the cloth upon the measuring-cylinder A. When ready for starting the measuring and registering of the cloth, the lever $c^{29}$ is depressed, by which single movement of the hand the arms of the disk C are thrown into working position, and also the impression-roll $c^{31}$ dropped to place upon the cloth, while the collar of the stop $c^{34}$ is so adjusted and held by the set-screw $s^3$ upon the hub of the hand-lever $c^{29}$ that when the same is depressed and the machine is in operation the stop $c^{33}$ prevents the impression-roll $c^{31}$ from crowding the cloth too deep between the types and causing irregular movement or slurred printing, but at the same time presents no obstacle to the raising of the roll $c^{31}$ by lifting the lever $c^{29}$, or by the bar $a^6$, as before described.

The printing mechanism is supplied with ink or color by inking-rolls N, Figs. 2, 5, combined with a distributing-roll, $n'$, driven by a belt from a pulley, $n^5$, Figs. 1, 5, secured upon the shaft of the actuating-cylinder B. The size of the rolls N $n'$ and pulley $n^5$ should be such that the surface of the rolls N will move as nearly as practicable with the same velocity as the face of the type upon the disk C, so that the type in passing the rolls N and taking ink therefrom shall have no tendency to slip or drag the ink.

The rolls N are supplied with ink from a fount, $n^2$, in which a wallower-roll, $n^7$, runs, and which is brought into contact with a transfer-roll, $n$, for supplying the ink at proper intervals. This wallower-roll is moved against and from the roll $n$ by an oscillatory lever, $n^3$, which carries the fount and is actuated intermittingly by a cam-pin, $n^4$, carried by a pulley, $n^5$, and a spring, $n^{10}$. This movement of the fount and wallower carries a ratchet, $n^8$, secured upon the shaft of the wallower, past a stationary pawl, $n^9$, which, engaging with the teeth of the ratchet, causes an intermittent rotation of the wallower in the fount, to keep its surface covered with ink.

In the frame of the machine a stop-pin, $n^6$, is placed to prevent the lever $n^3$ from swinging farther than is proper, while a spring, $n^{10}$, is provided to insure the proper return of the lever and the withdrawal of the wallower from contact with the transfer-wheel $n$.

The ink-rolls N should be so situated and actuated with reference to the disk C that the proper change of the integer types will be made, not only after the contact of the type with the cloth in printing, but also before the contact of the types with the rolls for inking them.

If, because of the light color of a fabric, or for any other reason, it should be undesirable to mark it with ink to register the measure, the ink may be omitted, the type run dry, and the length of the piece measured, as indicated by the types, read off by the operator and noted on a memorandum-book or on a card. The actuating-cylinder B in this instance is made of the same diameter as the measuring-cylinder A; but it is made a little longer than the width of the cloth to be measured. The surface of the actuating-cylinder is also rough or otherwise prepared, so that it may adhere to and be turned by frictional contact with the cloth.

Upon the shaft of the actuating-cylinder is placed a regulator-pulley, $b'$, fitted to turn freely thereon, and is retained in position and rotated by a driving-plate, $b^{11}$, which is secured by a set-screw, $b^{15}$, upon the shaft of the actuating-cylinder. Upon the driving-plate $b^{11}$ is placed a friction-spring, $b^7$, which, by means of felt or other suitable rubbing material attached to its outer surface and fitting the inside of the pulley $b'$, causes the same to revolve with the plate $b^{11}$, the spring $b^7$ being carried around by driving-studs $b^{12}$ in the plate $b^{11}$ acting upon the pin $b^{16}$, projecting between them from the spring, which cause it to revolve, but do not affect its tension or the amount of friction it may exert on the pulley $b'$. The amount of this friction is regulated by the tension of the spring $b^7$, which is governed by crank-levers $b^8$, actuated by the arm of a regulating-screw, $b^9$, of, say, one-fortieth of an inch pitch, and a hand-nut, $b^{10}$, Fig. 6, provided with a scale graduated to correspond to some division of the pitch of the screw—say one twenty-fifth part, equal to one-thousandth of an inch. By this means the operator can adjust the friction of the spring $b^7$ with great nicety, so as to obtain as light or strong a pull upon the shell of the pulley $b'$ as may be desired.

The regulating-pulleys $b'$ and $b^2$ are slightly tapering or conical in form, and are set in reverse positions, so that the large end of the one shall agree with the small end of the other, one regulating-pulley, $b'$, as described, being placed upon the shaft of the actuating-cylinder B. The other pulley, $b^2$, is secured upon the shaft of the measuring-cylinder A. A belt, $b^{14}$, passes over these pulleys and is guided upon any zone of their peripheries by means of a belt-guide, $b^3$, upon a screw-stud, $b^4$, projecting from the frame T, the position of the belt-guide $b^3$ being regulated by a micrometer-nut, $b^5$, and index $b^6$, Fig. 6. By these means the actuating-cylinder B may be made to turn the measuring-cylinder A with a surface velocity equal to that of the cloth that is being measured, relieving the cloth from the labor mentioned of driving the measuring-cylinder A and the registering and dial mechanisms.

The proper amount of help to be given to the measuring-cylinder A will vary with the different kinds, widths, thicknesses, and amount of pull and pressure required to lay out smoothly the cloth or material to be measured, and also with the differences of quality, as elasticity, adhesiveness, &c. The proper adjustment of the belt-guide $b^3$ and friction-spring $b^7$ for any one sort of goods having been found by trial and recorded most conveniently in tabular form, the machine may always be set by the table-numbers for that kind of goods according to the record without delay or difficulty.

In measuring coarse goods, and in other cases where the amount of help to the measuring-cylinder is not required to be regulated with such great nicety, both of the regulating-pulleys may be made, like the pulley $b^2$ on the shaft of the measuring-cylinder, plain conical pulleys, both secured upon their respective shafts, and the belt $b^{14}$ passed around them, as already described, thus dispensing with the driving-plate $b^{11}$, the friction-spring $b^7$, the crank-levers $b^8$, the regulating-screw $b^9$, and hand-nut $b^{10}$, Fig. 6, and effecting the necessary regulation by guiding the belt to different zones of the pulleys by means of the belt-guides $b^3$, screw-stud $b^4$, micrometer-nut $b^5$, and index $b^6$, Fig. 6, as before described.

To still further simplify and cheapen the regulating apparatus for rough work, the belt-guide, screw-stud, micrometer-nut, and index may be dispensed with, and the two reversed conical pulleys, instead of being made with an even slope on their peripheries, may be made with a series of steps of equal width and of progressively but slightly increasing diameter, that of the smallest diameter of one series being opposite the largest of the other series, and the belt may be shifted by the hand of the attendant from step to step to change the speed and vary the amount of help rendered to the measuring-cylinder for the purpose of regulation.

To insure the stopping of the machine at the proper time, and also to prevent any accidental movement of the measuring or registering mechanism at a time when they should remain at rest—as when feeding in a new piece of cloth or adjusting the register for measuring a new section of the cloth—there is provided a three-arm crank-lever, $k^4$, supported by and turning freely on the rock-shaft $l^8$, for shifting the driving-belt from the fast to the loose pulley, and the reverse; and there is also provided a brake mechanism consisting of brake-shoes L L, fitted loosely upon the ends of a yoke, $l'$, lined with leather or other material giving sufficient grasping or tractive power. These brake-shoes are curved to fit upon wheels $l^{12}$, one of which is secured to the shaft of the measuring-cylinder A, the other to the shaft of the actuating-cylinder B.

When the machine is in operation, the brakes are held a little distance from the surfaces of the wheels $l^{12}$, and when it is desired to stop the machine the brakes are pressed against the wheels $l^{12}$ by means of the yoke $l'$, rod $l^2$, and brake-spring $l^3$, Fig. 4. The brake-rod $l^2$ is guided by a bracket, $l^5$, which is secured to the frame T of the machine. The amount of pressure exerted upon the brake by the spring $l^3$ is regulated by nuts $l^4$. Upon the lower part of the brake-rod $l^2$ is fixed, by means of a set-screw, $l^{17}$, a collar, $l^6$, upon which is an arm or projection, $l^{15}$, carrying a movable fulcrum, $l^{13}$, which is arranged to slide from and toward the brake-rod $l^2$, the set-screw $l^{14}$ holding it wherever set. The yoke $l'$ is made to fit a little loosely upon the brake-rod $l^2$, and rests upon the adjustable fulcrum $l^{13}$ and the fixed fulcrum $l^{16}$ on the opposite side of the collar $l^6$ when not in action and the fulcra standing at equal distances from the rod $l^2$; but when by the action of the brake-spring $l^3$ the brake-rod $l^2$ is lifted until the brakes are brought into contact with the peripheries of the wheels $l^{12}$, the fulcra being in the position just described, the yoke $l'$ will bear equally upon both the brakes.

By the adjustment of the fulcrum $l^{13}$ to the position shown by the full lines in Figs. 4$^e$, 4$^f$, the proportion of the pressure exerted by each of the two brakes upon its wheel will be different and may, by adjusting the movable fulcrum, be varied at will from equilibrium to a preponderance by the brake L proportionate to the shortening of its distance from the fulcrum $l^{13}$, and thus the brake L may be made to act with more vigor and a little quicker upon the actuating-cylinder than the brake L will act upon the measuring-cylinder.

When the machine is running, the yoke $l'$ is depressed and the brakes are separated from their wheels $l^{12}$ by means of a forked arm, $l^7$, which is pressed upon the hub of the yoke $l'$. The forked arm $l^7$ is fixed upon and actuated by a rock-shaft, $l^8$, Figs. 2, 4, which turns in bearings upon the frame of the machine. The lever $l^9$, Figs. 1, 2, is secured firmly to the rock-shaft $l^8$, and its forward end extends to and is held by a trip-latch, $l^{10}$, when the machine is running. In this position of the lever the forked arm is depressed, the spring $l^3$ compressed, and the fork and the brakes are clear of their wheels. The latch $l^{10}$ of the brake-lever $l^9$ is provided with a set-screw, $l^{11}$, Figs. 2 and 18, by means of which the depth of the engagement of the end of the lever $l^9$ with the latch can be adjusted. This latch is secured upon the rock-shaft $k^7$ so that any motion of the trip-rail $k^{12}$ or of the dial M, that trips the latches $l^{10}$, Fig. 2, and $k^5$, Fig. 5, both sets the shipper K free to throw off the driving-belt from the fast to the loose pulley to stop the machine and also sets the brakes free to close and compel the actuating-cylinder B and measuring-cylinder A instantly to stop, after which the operator of the machine, by moving the brake-lever $l^9$ upon its latch $l^{10}$, will cause the shaft $l^8$ to rock and, depressing the forked arm $l^7$, throw off the brakes, to leave the cylinders free to be turned by hand for feeding in the cloth, or for any adjustment required, without necessarily starting the machine; but a lug or projection, $k^{13}$, Fig. 5, is provided upon the shipping-lever $k^4$ in such a position, Figs. 2, 4, that the movement of the shipping-lever $k^4$ in guiding the belt upon the fast pulley to start the machine again will cause the lug $k^{13}$ to move the brake-lever $l^9$ from its stop $k^{14}$ back upon its latch $l^{10}$, and at once disengage the brakes, and thus a single movement of a handle, $k^8$, of this lever will clear the brakes from their wheels $l^{12}$, and also throw the belt upon the fast pulley; and if the movement of the handle $k^8$ be carried far enough the latches $l^{10} k^5$ will catch and hold their respective levers, $l^9 k^4$, and the machine will continue in operation until a movement of the latches $l^{10} k^5$ releases the levers $l^9 k^4$ and the shipper-spring $k'$ throws the belt off, while the brake spring $l^3$ throws the brakes on.

The power is given to the machine by means of a belt with fast and loose pulleys $j' j^2$, constructed in the usual manner. The belt is guided upon the pulleys by a forked shifter-bar, K, Figs. 1, 2, 3. The shifter is connected by a rod, $k^2$, with the pendent arm of the lever $k^4$, Figs. 1, 5. When the machine is to be started, the operator depresses the handle $k^8$ on the upper arm of the lever $k^4$, throwing the belt upon the fast pulley $j'$ by means of the connecting-rod $k^2$ and shifter K, and at the same time lifting the lever $k^4$ onto a trip-latch, $k^5$, Fig. 5, which holds the shifter in this position. This movement of the connecting-rod $k^2$ compresses a spring, $k'$, holding it in such position that the instant the trip-latch $k^5$ is moved and the lever $k^4$ liberated the spring $k'$ will throw forward the connecting-rod $k^2$ and shifter K, shifting the belt to the loose pulley $j^2$, Figs. 1, 2, and permitting the machine to stop at once.

By means of the set-screw $k^{16}$ in the trip-latch $k^5$, the depth of the engagement of the trip-latch $k^5$ with the end of the lever $k^4$ can be regulated so as to make the tripping movement as light and delicate as may be desired. The trip-latch $k^5$ is secured to a shaft, $k^7$, Figs. 2, 5, which rocks in a journal-bearing upon the frame T of the machine. Upon the shaft $k^7$ is secured a lever, $k^6$, which is provided with an adjustable spring, $k^9$, to assist in the operation of tripping the latch $k^5$, as desired. The other end of the lever $k^6$ is connected by a rod, $k^{11}$, to a trip-rail, $k^{12}$, Figs. 2, 5, in such a way that lifting the trip-rail $k^{12}$ will cause the latch $k^5$ to disengage from the lever $k^4$, permitting the belt to be thrown off, as described.

The fabric to be measured, as before described, passes under the trip-rail $k^{12}$, and any obstruction to the passage of the same, anywhere upon the surface of the fabric, will, in passing, lift the rail and stop the machine, whether such obstruction be accidental, as a fold or knot of the material, or the trip-wedge $k^{15}$, secured to the cloth for the purpose of stopping the machine when its point of attachment reaches the trip-rail. Upon the shaft $k^7$ is also secured a trip-arm, $m^3$, of the counting mechanism, so arranged that by the action of a trip-pin, $m^2$, upon the arm $m^3$ the latch $k^5$ is tripped and the machine stopped.

The dial mechanism, Figs. 1, 2, 5, 18, consists of a dial ratchet-wheel, M, with teeth $m^{11}$ on its edge and a series of equidistant and numbered holes, $m^{14}$, Figs. 5, 18, in its side corresponding with the ratchet-teeth, (or such of them as indicate units of measure of the measuring-cylinder.) To these holes two adjustable pins are fitted, which project from the side of the wheel. One of the pins, $m'$, (shown in Figs. 2, $5^g$, $5^h$, 18,) is placed as the starting-point or zero of measure. The other pin, $m^2$, is the trip-pin, and may be set in a hole as many teeth ahead of the zero-pin as it is desired to count. By the action of a pawl, $m^4$, the dial M is caused to turn one tooth with each revolution of the measuring-cylinder A (such movement of each tooth in the case shown in the drawings will indicate one unit measured by the cylinder) until the trip-pin $m^2$ strikes the trip-arm $m^3$ to trip the latches $k^5$ $l^{10}$, and through their connections put the driving-belt on the loose pulley and the brake into action. The pawl $m^4$ is carried by a lever, $m^5$, which is actuated by a cam, $m^6$, secured upon the shaft of the measuring-cylinder. This cam $m^6$ by its revolution causes the pawl $m^4$ to move the ratchet one tooth for every revolution of the measuring-cylinder. The dial M is also provided with a detent, $m^7$, which prevents it being dragged back by the return motion of the pawl $m^4$. When the desired number has thus been counted, the pawl $m^4$ and detent $m^7$ are lifted by the hand of the attendant turning the arm of the detent, and the dial M returns to the starting-point. The pins are made of steel and split and tempered, as shown in Figs. $5^g$, $5^h$. The slit, being slightly opened toward the end, is compressed when it enters the hole and holds the pin safely in its place by friction. A spring, $m^9$, Fig. 5, is secured by one end to the shaft of the ratchet M, the outer end of the spring being either secured to the stationary frame T or held by the friction-rubber $m^8$ in a box, $m^{10}$, fixed on the frame of the machine, as shown. Thus the counting movement of the dial M draws upon the spring until force enough has accumulated to make the rubber slip, and upon the tripping of the pawl $m^4$ and detent $m^7$ by the operation as described the spring will at once and automatically return the dial M to zero.

If it be desired to ascertain the linear dimensions within the notation of the dial of a whole piece of cloth without stopping the measurement at any intermediate point, the dial is turned to zero; but the trip-pin $m^2$ is not set and the stopping mechanism is tripped by the hand of the attendant and the machine stopped, when the cloth has run through, until its end reaches the measuring-cylinder. The number of holes which the dial has turned from the zero-point will then indicate the number of units measured.

If the teeth of the ratchet were increased in number four times, and the driving-pawl $m^4$ made a stroke at each quarter of a revolution of the measuring-cylinder, then every fourth ratchet-tooth would indicate one unit, and the intermediate teeth quarter-units. In this case the holes to indicate units should be made at every fourth tooth of the ratchet.

Having been measured and marked, the fabric passes over the actuating-cylinder and through the space between the bearing or rock-shaft $d^5$ and a tension or stretching rod, $d^6$, carried on arms $d^{12}$ of the shaft, which also has a notched detent-wheel, $d^{10}$, secured upon it. A spring detent-pawl, $d^9$, attached to the frame, engages with the detent-wheel, which may be adjusted and held in position by the pawl to set the stretching-rod $d^6$ to give such degree of sinuosity to the course of the cloth upon the rods $d^5$ and $d^6$ and corresponding friction and retardation to its movement as may be necessary for graduating its stretching, so as to plicate it smoothly and wind it evenly and tightly into a compact package. From the stretching-rods $d^5$ $d^6$ the cloth passes around the guide-roll $d^7$ to the plicator, which consists of two tapering and converging side bars, $e^7$, around which the two edges of the web of fabric are drawn to begin the plication, which is finished by drawing the two partly-folded sides of the web through between two guides or fingers, F. The plicating-surfaces of these guides converge to a common center with the plicating-surface of the side bars, passing around which the two sides or plies of the web come together to complete the plication, and thence pass on to a smoothing-roll, G. The side bars, $e^7$, fingers F, and smoothing-roll G are mounted upon a carriage, $e^3$, which traverses upon a slide, $e^2$, to which it is confined by glands $e$, Fig. 1, so that they may be adjusted laterally by means of a screw, $e^4$, nut $e^5$, and handle $e^6$, so that the apex $e'$ of the side bars, $e^7$, or point where the fold or plicating line $a$ of the cloth passes or turns, may be adjusted laterally to suit different widths of cloth without disturbing the relation of the edge of the cloth to the registering mechanism, and, also, so that the line of plication $a$ may be located in the lengthwise center line of the fabric, or at any desired distance on one side thereof, as well as regulating its position to adapt it to any irregularity in the running of the material that would tend to prevent the edges of the plies from being laid evenly together, such lateral adjustment being made at will while the plication is going on and without interrupting it and without affecting the direction of the motion of the cloth from the smoothing-roll G toward the winding mechanism, and thus conducing to the automatic production of a smooth and neat package.

The smoothing-roll G turns freely by the action of the cloth in passing over it, and may be in one piece or composed of independent sections, each at liberty to conform to inequalities of motion of different parts of the cloth, whether caused by the yielding of the brace $g^2$ or otherwise. The shaft $g'$ of the smoothing-roll G is secured to a carriage, $e^3$, by a pivot, $e^8$, that permits it to swing, and this movement is governed by a brace, $g^2$, and adjustable spring $g^3$, so that the end of the roll G, where the line of plication $a$ passes, may yield slightly to any extraordinary tension or pressure from whatever cause that would tend to rupture the cloth upon the point $e'$ of the plicator.

From the smoothing-roll the cloth passes to a tension regulator and equalizer, and thence to a revolving winding board or rod, upon which it is wound by a strong pull, regulated by the adjustment of the stretching-bar $d^6$, to wind it into a smooth and compact package. When winding the cloth upon a wide board, the pull being made through the board is of unequal force, and if not compensated the rapid revolution of the board would cause a quick succession of jerks or unequal pulls upon the cloth, that would injuriously affect the plication, the measuring, and the packaging operations. To counteract such injurious action a tension-equalizer is provided, which consists of a swinging bar or roll, H, whose axes are supported by brackets $h^4$, under which roll the cloth passes, and which, being held by springs $h'$ against the cloth, will alternately yield to the extreme tension or take up slack, as required, and so reduce the inequality of the pull around the plicator to a minimum.

The winding mechanism consists of a shaft, J, fitted to run in journal-boxes in the frame T and bracket $t$ of the machine, upon which shaft are fast and loose pulleys $j'$ $j^2$ for driving it. On the inner end of the shaft J is secured a winding head or chuck, $j^3$. Upon the upright arm $t'$ is secured a box-nut, $j^7$, fitted with a screw-shaft, $j^4$, having a hand-wheel, $t^2$, on its outer end, and on its inner end a loose revolving head or center, $j^5$. A slightly-tapered winding-bar, $j^6$, either flat or square, according to the desired form of the package, is placed between the fast head $j^3$ and loose head $j^5$, with its ends inserted in grooves or recesses formed in these heads in the usual manner, and gripped firmly by turning the screw-shaft $j^4$ by means of the hand-wheel $t^2$.

The end of the fabric being secured to the winding-bar by a turn thereon, the machine is started and the cloth wound into a finished roll or package, the same operation also drawing the cloth through and actuating the other parts of the machine, as described. In winding the flattened form of package a board, $j^8$, may be first laid to the side of a flat winding-bar, $j^6$, Figs. 16, 17, the board held between the head $j^3$ and the adjustable clamp $j^9$, and the cloth wound around the board $j^8$ and winding-bar together. When the winding is complete, the screw $j^4$ is withdrawn, the package taken from between the heads $j^3$ $j^5$, the steel winding-bar drawn out, and the board left in the package. In cases where the bar is objectionable, or where more power is required than can conveniently or safely be applied to one end of the package, two heads or chucks may be geared together, as shown in Figs. 15, 15$^a$, 15$^b$, so as to apply the power at both ends of the package.

Thus by a single operation the cloth is outspread and measured without stretching, and then tightly stretched, smoothly plicated, and wound into a compact package.

The devices shown and not claimed in this application, so far as they are shown and claimed in the application of Andrew H. Sutton and Peter H. Watson, No. 102,350, are herein and hereby disclaimed as of my sole invention.

In machines for measuring and packaging cloth and other textile fabrics, I claim—

1. The combination of mechanism, substantially as described, for ascertaining and indicating to the eye of the attendant the lineal measure of a piece of textile fabric while in an outspread but unstretched condition, with mechanism, substantially as described, for receiving the fabric as it leaves the measuring mechanism and plicating it lengthwise, and mechanism, substantially as described, to receive the plicated fabric as it leaves the plicator and make it up into a package, substantially as described.

2. The combination of mechanism, substantially as set forth, for ascertaining the lineal measure of a piece of textile fabric and registering the same upon it while in an outspread but unstretched condition, with mechanism, substantially as described, for receiving the fabric as it leaves the measuring and registering mechanisms and plicating it lengthwise while it passes, and mechanism, substantially as described, for making it up into a compact package, the several mechanisms being parts of one machine and co-operating to produce the result, substantially as described.

3. The combination of a measuring-cylinder with a series of elastic pressure-rolls acting independently of each other, substantially as described.

4. The combination of elastic pressure-rolls with swing-arms on which the rolls are carried, springs to apply pressure to the rolls and bear them against the cloth, so as to hold it in contact with the measuring-cylinder, means, substantially as described, to withdraw the rolls simultaneously from the cloth when required, and latches to hold any number or all of the rolls off the cloth, substantially as described.

5. The combination of the pressure-rolls $a'$ with the hand-lever $a^5$, the rock-shaft $a^8$, the arms $a^7$, and the bar $a^6$, which they carry, and the suspension-latches $a^4$, substantially as described.

6. The combination of a measuring-cylinder with a series of pressure-rolls, $a'$, each member of the series mounted upon an arm, $a^2$, that will swing under pressure toward and from the cylinder and rock a little in a direction transverse to the plane of swing, so that the rolls are capable of a wabbling motion, which enables them to conform themselves to both lengthwise and breadthwise inequalities of surface of the cloth under measurement, thereby pressing it more evenly against the cylinder and insuring greater accuracy of measurement, substantially as described.

7. The combination of a measuring-cylinder, registering mechanism, and means, substantially as described, for passing the cloth through the machine, with a series of independently-acting rolls held by elastic pressure against the cloth to bear it lightly and evenly against the measuring-cylinder, each member of the series being free to revolve in conformity with the surface speed of the cloth at the point of contact, substantially as described.

8. The adjustable smoothing-rods $d'$ $d^2$, whereby the cloth is straightened as it passes into the machine, as set forth, so that it shall not be stretched to render it liable to inaccurate measurement, in combination with the measuring-cylinder and the adjustable stretching-rods $d^5$ $d^6$, whereby the cloth is subjected after being measured to strong tension, that it may plicate smoother and more evenly and may wind into a more compact package, substantially as described.

9. A measuring-cylinder consisting of a series of separate light narrow lags in contact at their bases only, each lag attached separately to the rims of light wheels secured upon a shaft, in combination with an external envelope provided with a roughened surface, as described, whereby frictional contact with the cloth passing under measurement, lightness to avoid inconvenient inertia and momentum, sensitiveness to the changing velocity of the surface of the cloth, and unchangeability in circumferential dimensions, to secure precision of measurement, are attained in a high degree, substantially as described.

10. The combination of the pressure-rolls $a'$, swing-arms $a^2$, with their catches, $a^9$, and corresponding hinged latches $a^4$, each catch having stops $a^{12}$ $a^{13}$, to limit its upward and downward movement, substantially as described.

11. The actuating-cylinder B and measuring-cylinder A, in combination with differential regulating-pulleys provided with a driving-belt, $b^{14}$, whereby the shaft of the measuring-cylinder is supplied with the requisite power to actuate the register and dial and overcome the friction of its journals, substantially as described.

12. The combination of the actuating-cylinder, measuring-cylinder, and a pair of differential regulating-pulleys, $b'$ $b^2$, having an adjustable belt, $b^{14}$, to connect them and govern their relative speed, with an adjustable friction-rubber, $b^7$, through which the power is transmitted between the rim of its pulley and the shaft of the cylinder on which it is mounted as required for measuring different classes of goods, substantially as described.

13. The combination of the differential regulating-pulleys $b'$ $b^2$, belt $b^{14}$, adjustable belt-guide $b^3$, graduated nut $b^5$, and index $b^6$ with the adjustable friction-rubber $b^7$ and driving-plate $b^{11}$, whereby the power and speed transmitted by the belt $b^{14}$ to the shaft of the measuring-cylinder can be regulated, substantially as described.

14. The combination of an actuating-cylinder and differential regulating and assisting mechanism, substantially as described, with a measuring-cylinder and registering mechanism, substantially as described.

15. The combination of a measuring-cylinder, registering mechanism, substantially as described, actuating-cylinder, and winding mechanism, substantially as described, with brakes and holding and tripping mechanism, substantially as described, for simultaneously shifting the driving-belt of the machine from the fast to the loose pulley and stopping the motion of the measuring, registering, and winding mechanisms, substantially as described.

16. The combination of the measuring-cylinder A, registering mechanism, substantially as described, actuating-cylinder B, brakes L, yoke $l'$, adjustable pressure-spring $l^3$, latch $l^{10}$, to engage with the lever $l^9$ and hold the brakes out of action, and the latch $k^5$, to engage with the lever $k^4$ and hold the driving-belt in action, with a trip-arm, $m^3$, to detach both of the levers $l^9$ $k^4$ from the levers whenever it is required to stop the machine, substantially as described.

17. The combination of the measuring-cylinder, registering mechanism, substantially as described, actuating-cylinder, brakes, and the mechanism, substantially as described, for shifting the driving-belt and the brakes out of and into action, with a dial, M, adjustable stop-pin $m^2$, and trip-arm $m^3$, to stop the machine whenever any predetermined length of cloth has been measured, substantially as described.

18. The combination of the dial M, its trip-pin and trip-arm, with measuring, registering, winding, and stopping devices and their connections, substantially as described, whereby the machine may be set to indicate the measurement of a web in consecutive numbers from its beginning to its end and to mark the registry of measurement in concurrence with the indicated measure from a point a few yards from the beginning of the web, the reciprocal and supplemental action of the dial and register lessening the labor and skill needed for working the machine and the liability to undetected error from incorrect starting of the registry, substantially as described.

19. The lever $k^4$ and stop $k^{13}$ of the mechanism for shifting the driving-belt of the machine to and from the fast and loose pulleys alternately, in combination with the lever $l^9$ of the brake mechanism, by means of which the movement of the lever $k^4$ in throwing on the driving-belt to start the machine will cause the lever $l^9$ to throw the brakes off, substantially as described.

20. The belt-shifter and its connections and the dial and its connections, substantially as described, in combination with the measuring and registering devices and the winder mechanism and brakes, substantially as described, whereby the brakes shall act instantly after the driving-belt has been thrown off and instantly before the driving-belt is thrown on, substantially as described.

21. The combination of the measuring and actuating cylinders, the brakes, and the adjustable yoke for carrying them with an adjustable fulcrum, whereby the pressure of the spring is so applied as to act with equal force upon both brakes, or with more or less preponderance upon the brake of the actuating-cylinder, substantially as described.

22. An impression roll or platen adapted to being moved into position to support the cloth against the action of the types and moved back from that position, mechanism, as set forth, for carrying the printing-types, capable of being moved within the margin of the cloth to imprint the measure thereon and of being moved back from that position, in combination with a lever having suitable connections, as described, whereby the impression-roll and the printing-types can by one movement of the lever be simultaneously started into action and by the opposite movement be withdrawn from action and held in either position by automatically-acting catches connected with the lever, substantially as described.

23. The combination of the smoothing-rods $d'$ $d^2$, their rock-arms, the actuating-cylinder and compensating pulleys, the registering-type, the impression-roll, and the measuring-cylinder, arranged, as described, to form a recess at the end of measuring-cylinder, whereby space is obtained for the types and the platen to operate in, and across which recess the margin of the cloth under measurement is evenly held by the smoothing-rod $d'$ and actuating-cylinder supported by the measuring-cylinder and passes between the registering-type and the platen, and is printed before distention by the actuating-cylinder and the stretching-rods $d^5$ $d^6$, thus obtaining a clear impression and more accurate registry, substantially as described.

24. The combination of a hinged impression-roll with an elastic face, an adjustable spring to press the roll against the cloth to be imprinted and sustain it against the action of the types, an adjustable stop, $c^{34}$, and a corresponding fixed stop, $c^{33}$, to limit the depth to which the cloth shall be pressed over and envelop the surface of the type so as to cause the printing-ink to be deposited in a depression below the general surface of the cloth, thereby protecting the registry from defacement and the blank opposing surface of the cloth from being smeared by rubbing off ink during the subsequent folding, winding, and handling in making up the package, substantially as described.

25. The hinged impression-roll and the means, substantially as described, for throwing it into and out of action, and the means, substantially as described, for throwing the printing-type into and out of action, in combination with a trip-lever, $c^{29}$, common to both of these starting and stopping mechanisms, whereby the platen is drawn back whenever the types are thrown out of action and returned simultaneously with the types when they are again brought into action, substantially as described.

26. The combination of a platen made to yield to variable pressure with an adjustable stop, $c^{34}$, and a fixed stop, $c^{33}$, to limit the distances that the cloth shall be borne within the circular sweep of the type to the points that will produce the degree of indentation of the types into the surface of the cloth that will secure the best impressions for cloth of different textures and thicknesses, substantially as described.

27. The actuating-cylinder, its compensating pulley and belt, and means, substantially as set forth, for transmitting motion from it to the mechanism for inking the registering-type, in combination with the measuring-cylinder, its compensating pulley, and registering-type, whereby the measuring-cylinder and the register are relieved of the burden of operating the mechanism for inking the types, substantially as described.

28. The combination of the trip-rail $k^{12}$ and the tripping mechanism connected therewith, the stop-wedge $k^{15}$, attached to the fabric, and the spreading-table with the measuring-cylinder, whereby the measuring will be arrested and the machine will be stopped at any point in the length of the cloth at which the wedge may be attached, substantially as described.

29. The combination of the trip-rail $k^{12}$, connecting-rod $k^{11}$, shifter-trip spring-lever $k^6$, and tripping mechanism actuated thereby, and the spreading-table, with the measuring-cylinder, so that a fold of cloth or other obstruction in passing the trip-rail will lift it and stop the machine before it can reach the measuring-cylinder or affect the measure and registry, such obstruction itself being thus utilized to automatically prevent the injury which it might otherwise do, substantially as described.

PETER H. WATSON.

Witnesses:
ALOHA VIVARTTAS,
R. W. WATSON.